Aug. 18, 1942.   E. E. HARPER   2,293,647
TRANSMISSION LINKAGE FOR MECHANICALLY-OPERATED CONNECTIONS
Filed Feb. 18, 1941
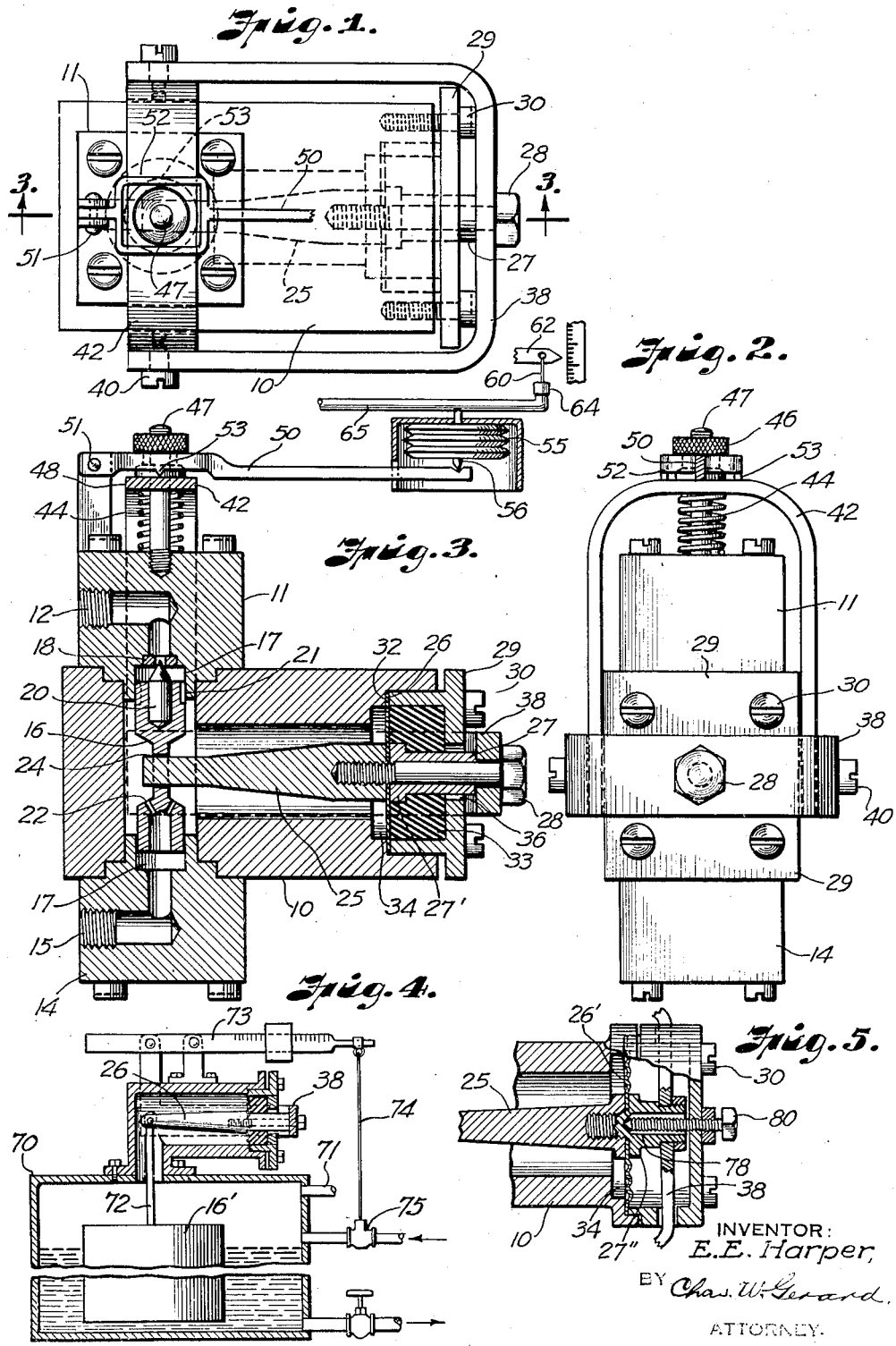

Patented Aug. 18, 1942

2,293,647

UNITED STATES PATENT OFFICE 2,293,647

TRANSMISSION LINKAGE FOR MECHANICALLY OPERATED CONNECTIONS

Elmer E. Harper, Kansas City, Mo.

Application February 18, 1941, Serial No. 379,540

4 Claims. (Cl. 74—99)

The present invention relates to transmission or linkage connections for certain mechanically operated constructions; as for example, the operative connections associated with certain types of valves, floats and also certain forms of temperature or pressure control elements, or the like, and aims to improve the transmission or linkage connections for such mechanically operated constructions, to the end that a more effective and sensitive transmitting action will be obtained as regards the indicating or control functions of such elements. For a more specific example, one purpose of the invention is to transmit an actuating force to or from a mechanism within a closed chamber with a minimum loss of the actuating force, by the elimination of the use of stuffing boxes, or of diaphragms or bellows or the like as direct transmitting links or connections in the transmission of that force.

Accordingly one of the objects of the invention is to devise an improved construction of this character in which a flexible disk or diaphragm element is employed, not as a direct transmitting element of the linkage or transmission connections, but in such an operative relationship thereto as to enable reciprocal thrust effects to be transmitted along a line substantially parallel to the plane of the diaphragm element. In accomplishing this result the diaphragm element is arranged to serve in effect as a flexible fulcrum support for one of the directly operating arms or elements of the transmission, and the arrangement is adapted to confine the flexing movements of said diaphragm to movements substantially at right angles to the direction of the actuating thrusts received and transmitted by said linkage or transmission connections.

One useful application of the improved construction is in relation to valve structures, and particularly to valves required to dispense with packing, and in this relation the invention provides for a diaphragm element mounted so as not to be subject to any movement in directions parallel to the axis of the valve, but to confine it to only such flexing movements as are necessary to permit opening and closing movements of the valve.

In its broader aspect, however, the invention contemplates an arrangement and construction of transmission or linkage connections including a diaphragm mounting or support whereby either operating or control thrusts may be transmitted in either direction through the linkage, but always in directions substantially parallel to the plane of the diaphragm element,—so that the improved construction is useful for any one of numerous types of operating, controlling, indicating or registering functions and regardless of which side of the diaphragm element represents the source of the operating or actuating thrusts to be transmitted through the connections with which the present improved arrangement of the diaphragm is used.

With the foregoing general objects in view, the invention will now be described by reference to the accompanying drawing illustrating suitable forms of construction and application of the proposed improvements, after which those features and combinations deemed to be novel and patentable will be particularly set forth and claimed.

In the drawing—

Figure 1 is a plan view illustrating an arrangement of mechanical operating connections embodying the invention and suitable for valve operation;

Figure 2 is an elevation of the same;

Figure 3 is a vertical sectional view, illustrating a section taken on the line 3—3 of Figure 1;

Figure 4 is a vertical sectional view illustrating another arrangement suitable for float-control operation; and Figure 5 is a sectional detail view showing a modified form of construction hereinafter referred to.

Referring now to the drawing in detail, and more particularly to Figures 1 to 3, these views illustrate the improved construction in operative relation to a valve, for the purpose of controlling such valves as are required to dispense with packing material on account of the character of the material (such as chlorine or other corrosive substance) which is being handled. For one form of packless valve it is common to use the so-called diaphragm type of valve; but in that type of valve the flow through the valve is in a direction at right angles to the plane of the diaphragm, which is extremely objectionable on account of the fact that pressure variations occurring in installations using this type always produce corresponding movements of the valve itself and consequent changes in the rate of flow. The present arrangement of operating or control connections makes use of a diaphragm element but not in the same relation as in the so-called diaphragm type of valve, and yet in such a way as to retain all the advantages of a packless valve as well as the sensitiveness of a diaphragm structure, but with none of the disadvantages referred to.

The valve and control structure illustrated in

Figures 1 to 3 comprise a valve body 10 to which is fitted a valve head 11 having an inlet port 12 and an outlet head 14 provided with an outlet port 15,—said ports being turned toward and facing each other for alining with the axis of the valve. This valve comprises a spool-shaped valve member 16, the opposite ends of which fit slidingly in valve cups 17, one of which is provided with a valve seat 18 at the inlet port and adapted for engagement by a valve needle 20 carried by the corresponding end of the valve member 16. As shown in Figure 3, one end of the valve member 16 is provided with slot passages 21 communicating with the inlet port and the other end of said member has openings 22 communicating with the outlet port.

The middle portion of the valve member 16 is provided with an opening 24 engaged by the free end of an actuating bar 25, the opposite end of which is clamped against one face of a flexible diaphragm element 26 by means of a clamping sleeve 27, through which and said diaphragm element a screw 28 is passed and screwed into the end of the bar 25. The inner end of the sleeve 27 has a head portion 27' of substantially the same size as the adjacent end of the bar 25 for clamping engagement with substantially equal areas on both faces of the diaphragm's central portion, the outer edge of which is engaged by a clamping member 29 attached by screws 30 to the valve body 10 and thereby clamping said outer edge of the diaphragm against an annular shoulder 32 on the interior of said valve body.

In some cases a soft rubber backing 33 (of almost pure gum consistency) may be vulcanized in place within said clamping member 28 for sufficient supporting engagement with the outer face of the diaphragm to resist any excess pressure that might be exerted from inside the valve, thus serving to prevent any distortion of the diaphragm element.

Ample clearance is also provided for inward flexing of the diaphragm by means of a recess 34 inside said annular shoulder 32, at the inner face of the diaphragm.

The sleeve 27 projects out through an opening 36 in the clamping member 28 (said opening being somewhat larger than the sleeve), and between the outer end of said sleeve and the head of the screw 28 is clamped a yoke 38, the legs of which extend past the opposite sides of the valve body 10 as shown in Figure 1, and have their ends clamped by screws 40 to the lower ends of a similar lifting yoke 42 extending upward and over the top of the valve head 11 and in spaced relation thereto for mounting a valve-closing spring 44 between said head and the top portion of the yoke 42, as clearly shown in Figures 2 and 3. By using a spring for normally closing the valve, the valve can be seated with a predetermined pressure, as adjusted by means of a nut 46 threaded on a pin 47 which is screwed into the top of the valve head 11 in exact alinement with the valve needle 20. The coil spring 44 is centered about said pin 47 and the latter projects through an opening 48 in the middle of the top portion of the yoke 42. With this arrangement it is apparent that the upward or closing thrust on the yoke 42 is exerted in a direct upward direction coinciding with the line passing through the center of the valve.

The opposite or opening movements of the valve (in opposition to the action of the spring 44) may be effected in various ways, an example of one method being illustrated by the drawing in Figure 3. This method utilizes a lever arm 50 fulcrumed at 51 and having branch portions 52 with bearing points 53 for engaging the top of the yoke 42 at opposite sides of the opening 48. The other or free end of said lever arm may be operatively arranged in position for actuation by suitable pressure bellows 55, the expanding action of which will, through an operating part 56, depress said lever arm and correspondingly actuate said yoke 42 for opening the valve against said spring action. Such operation may be carried out entirely automatically, as where the bellows device is rendered automatically responsive to weighing feeder mechanism such as the gravimetric apparatus illustrated in my Patent No. 2,100,316 dated November 30, 1937. This may be done by simply establishing a control connection 60 between the scale beam 62 of such feeder mechanism and the pilot or pressure relief valve 64 connected with the fluid pressure line leading to the bellows device.

With the improved construction it will be noted that the diaphragm element is not subject to any movement in a direction parallel to the axis of the valve, but only to such flexing movement as is necessary to permit any valve-lifting action of the bar 25 as produced by movement of the yoke connections 38 and 42 in response to movements of the lever arm 50. Hence any variation in pressure on the outlet side of the valve will not affect the diaphragm in any such way as to transmit movement to the valve. Moreover it is to be noted that the arrangement of the yoke connections is designed to apply the valve-actuating thrust along a line coinciding with the central axis of the valve, the purpose of said arrangement being to avoid producing any appreciable strains on the diaphragm.

While a spring is used for seating the valve with a predetermined pressure, it is obvious that the spring feature may be dispensed with and the closing movement of the valve carried out, if desired, by an entirely positive action as produced by the direct upward movement of the yoke connections.

In any case all the sensitiveness of a diaphragm action is obtained in a construction which also dispenses with any packing material with all its objectionable features of friction and being subject to the action of corrosive material; and this sensitiveness and freedom from the other objections noted are especially important in a control arrangement of the character referred to.

The foregoing is merely one example of an operating construction illustrating the use of connections employing the improved diaphragm feature for the control of a valve action, and it is of course apparent that other arrangements and constructions may be devised for employing the diaphragm element in a substantially equivalent relationship as part of control or operating connections, with similar results as regards the efficiency and extreme sensitiveness of the controlling or transmitting action; and that so far as the transmitting function is concerned, that function can be carried out in either direction. For example, an arrangement responsive to changing conditions inside a vessel (as by means of a float, bellows or other element responsive to changes in pressure, temperature or liquid level) may be constructed to utilize the same operative functions as already described by simply substituting such float or other appropriate element for the valve element in the illustrated construction, whereupon the movement of the responsive element inside the vessel will be transmitted to a control member or an indicating member outside the vessel, in an obvious manner.

A typical example of this illustrated in Figure 4, where in place of a valve chamber, a float 16' is arranged in a pressure vessel 70 (having an air pressure connection 71), so that said float element will therefore register the liquid level in said vessel. By connecting this float, as indicated at 72, with the end of the bar 25, which in turn is connected with the diaphragm element 26 and the yoke 38, the movements of the float may be transmitted to either an indicating means, or to an operating or control mechanism adapted to be connected with the ends of said yoke 38, and such means or mechanism is thereby made responsive to changes in the liquid level in the vessel 70. In the illustrated example, the yoke is shown attached to one arm of a scale lever 73, the other arm of which is provided with a link connection 74 for controlling the inlet valve 75 to the vessel 70 for the purpose of maintaining a constant liquid level therein. Thus a sensitive diaphragm element is included in the operating connections for effecting the same transmitting function as already described, and the arrangement of the yoke so that its ends terminate on the center line of the float element insures the application of the operating thrust or force to or from said float element without appreciable strain being imposed on the diaphragm—just as in the case of the valve element in the arrangement and construction first described.

In Figure 5 I illustrate a modification of the connection between the actuating arm 25 and the yoke 38, in which modified form the clamping element 27" is recessed as indicated at 79 for mounting a pointed screw 80 with its inner pointed end in the plane of the diaphragm 26' and hence in central counter-thrust relation thereto, for resisting any tendency toward lateral movement of the diaphragm due to pressure on the opposite face of the diaphragm.

Various other changes are of course possible and may prove desirable for adapting the aforesaid improvements to meet varying conditions of operation, and while I have shown and described practical and efficient forms of construction for the embodiment of said improvements I desire to be understood as expressly reserving the right to make whatever changes and modifications may fairly be deemed to fall within the spirit and scope of my invention as defined by the appended claims.

What I claim is:

1. In apparatus of the character described, a transmission linkage comprising an arm, means including a flexible diaphragm element for yieldingly fulcruming one end of said arm with the latter at substantially right angles to the plane of said diaphragm element, and a transmission link rigidly connected with the fulcrumed end of said arm, said link and arm extending in position for transmitting reciprocal thrust effects within a plane substantially parallel to the plane of said diaphragm element.

2. In apparatus of the character described, a transmission linkage comprising an arm, a flexible diaphragm serving to yieldingly fulcrum one end of said arm, and a transmission link rigidly connected to the fulcrumed end of said arm, said link and arm extending equal distances in the same direction from said diaphragm into position for transmitting reciprocal thrust effects within a plane substantially parallel to the plane of said diaphragm.

3. A transmission linkage comprising in arm, a flexible diaphragm serving to yieldingly fulcrum one end of said arm, and a yoke forming a transmission link rigidly connected with the fulcrumed end of said arm and having the opposite sides of the yoke extending on opposite sides of said arm and in coplanar relation therewith, said yoke and arm extending into position for transmitting reciprocal thrust effects within a plane substantially parallel to the plane of said diaphragm.

4. A transmission linkage comprising an operating arm for actuating a mechanically operated element, a flexible diaphragm serving to yieldingly fulcrum one end of said arm, a transmission link rigidly connected with the fulcrumed end of said arm, and a control mechanism connected in operative relation to said transmission link at a point in substantially coplanar relation with the path of movement of said mechanically operated element and adapted to impart operative movement thereto in a direction parallel to the plane of said diaphragm.

ELMER E. HARPER.